US012167416B2

(12) United States Patent
Lyu et al.

(10) Patent No.: US 12,167,416 B2
(45) Date of Patent: *Dec. 10, 2024

(54) METHOD AND APPARATUS FOR SEMI-PERSISTENT SCHEDULING AND CONFIGURED GRANT CONFIGURATIONS

(71) Applicant: Huawei Technologies Co., Ltd., Shenzhen (CN)

(72) Inventors: Yongxia Lyu, Ottawa (CA); Liqing Zhang, Ottawa (CA); Jianglei Ma, Ottawa (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,578

(22) Filed: Oct. 13, 2022

(65) Prior Publication Data

US 2023/0060991 A1 Mar. 2, 2023

Related U.S. Application Data

(63) Continuation of application No. 16/937,551, filed on Jul. 23, 2020, now Pat. No. 11,477,815.

(Continued)

(51) Int. Cl.

*H04W 72/04* (2023.01)
*H04L 5/00* (2006.01)

(Continued)

(52) U.S. Cl.

CPC ......... *H04W 72/23* (2023.01); *H04L 27/2626* (2013.01); *H04W 4/40* (2018.02); *H04W 72/0453* (2013.01)

(58) Field of Classification Search

None

See application file for complete search history.

(56) References Cited

U.S. PATENT DOCUMENTS

2012/0113831 A1* 5/2012 Pelletier ................ H04L 5/0053 370/252
2018/0242326 A1* 8/2018 Aiba ..................... H04L 1/1848

(Continued)

FOREIGN PATENT DOCUMENTS

EP 3282794 A1 2/2018
WO 2019134449 A1 7/2019

OTHER PUBLICATIONS

NTT Docomo, Inc., DCI contents and formats. 3GPP TSG RAN WG1 Meeting AH 1801, Vancouver, Canada, Jan. 22-26, 2018, R1-1800671, 12 pages, 2018.

CMCC: "Discussion on Remaining Issues for DCI",3GPP Draft; R1-1804099, 3rd Generation PartnershipProject (3GPP), Mobile Competence Centre ; 650, Route Des Lucioles ; F-06921 Sophia-Antipolis Cedex ;Francevol. RAN WG1, No. Sanya, China; Apr. 16, 2018-Apr. 20, 2018 Apr. 15, 2018 (Apr. 15, 2018), XP051426388, 7 pages.

(Continued)

*Primary Examiner* — Sai Aung

(57) ABSTRACT

Methods and apparatuses are disclosed for semi-persistent scheduling and configured grant transmission configurations. An example method, which is performed by a communication device, includes the steps of: transmitting, to a user equipment (UE), a radio resource control (RRC) signal or activation downlink control information (DCI) signal for semi-persistent scheduling (SPS) or configured grant (CG) transmission configuration; and transmitting, to the UE, a physical layer control signal comprising an indication of one or more parameters for SPS or CG transmission.

16 Claims, 4 Drawing Sheets

100
110a UE
120a
170a BASE STATION
190
110b UE
120b
170b BASE STATION
110c UE
130 CORE NETWORK
140 PSTN
160 OTHER NETWORKS
150 INTERNET

Related U.S. Application Data

(60) Provisional application No. 62/881,266, filed on Jul. 31, 2019.

(51) Int. Cl.

| | |
|---|---|
| ***H04L 27/26*** | (2006.01) |
| ***H04W 4/40*** | (2018.01) |
| ***H04W 72/0453*** | (2023.01) |
| ***H04W 72/12*** | (2023.01) |
| ***H04W 72/23*** | (2023.01) |

(56) References Cited

U.S. PATENT DOCUMENTS

| | | | | |
|---|---|---|---|---|
| 2019/0053211 | A1 | 2/2019 | Ying et al. | |
| 2019/0082456 | A1 | 3/2019 | Kim et al. | |
| 2019/0174533 | A1* | 6/2019 | Lee | H04L 1/1854 |
| 2019/0349142 | A1* | 11/2019 | Aiba | H04L 1/1819 |
| 2019/0349147 | A1* | 11/2019 | Aiba | H04L 5/0094 |
| 2020/0128557 | A1* | 4/2020 | Suzuki | H04W 8/04 |
| 2021/0068115 | A1* | 3/2021 | Gotoh | H04W 72/0453 |
| 2021/0185718 | A1* | 6/2021 | Ying | H04W 72/23 |

OTHER PUBLICATIONS

NTT Docomo et al: “Summary of 7.2.6.6 Enhanced ULconfigured grant transmission”,3GPP Draft; R1-1905609, 3rd Generation PartnershipProject (3GPP), Mobile Competence Centre ; 650, Route Des Lucioles ; F-06921 Sophia-Antipolis Cedex ;Francevol. RAN WG1, No. Xi’an, China; Apr. 8, 2019-Apr. 12, 2019, 38 pages. 2019.

R2-1713173 Huawei, “Summary of [99bis#41] [NR UP/MAC] Open issues on SPS and GF—Huawei”,3GPP TSG RAN WG2 Meeting 100 Reno, United States, Nov. 27-Dec. 1, 2017,total 57 pages, 2017.

3rd Generation Partnership Project (3GPP), Technical Specification NR; Medium Access Control (MAC) Protocol Specification 38.321 V15.5.0, section 5.8 Mar. 2019.

3rd Generation Partnership Project (3GPP), Technical Specification NR; Radio Resource Control (RRC); Protocol specification 38.331 V15.6.0, pp. 79-82 Jun. 2019.

3rd Generation Partnership Project (3GPP), Technical Specification NR; Radio Resource Control (RRC); Protocol specification 38.331 V16.0.0, pp. 350-356 Mar. 2020.

* cited by examiner

METHOD AND APPARATUS FOR SEMI-PERSISTENT SCHEDULING AND CONFIGURED GRANT CONFIGURATIONS

CROSS-REFERENCE TO RELATED APPLICATIONS

This application is a continuation of U.S. Non-Provisional patent application Ser. No. 16/937,551, filed Jul. 23, 2020, which claims priority to and the benefit of U.S. Provisional Patent Application No. 62/881,266 filed on Jul. 31, 2019, the entire content of these documents being incorporated herein by reference.

TECHNICAL FIELD

The present disclosure relates to methods and apparatuses for semi-persistent scheduling (SPS) and configured grant (CG) configurations.

BACKGROUND

In some wireless communication systems, a user equipment (UE) wirelessly communicates with a base station to send electronic signals to the base station or to receive electronic signals from the base station. The electronic signals may contain data or messages. A wireless communication from a UE to a base station is referred to as an uplink communication or uplink transmission. A wireless communication from a base station to a UE is referred to as a downlink communication or downlink transmission.

Resources are required to perform uplink and downlink communications. For example, a UE may wirelessly transmit data to a base station in an uplink transmission at a particular frequency, or during a particular slot in time. The frequency and time slot used are examples of resources (sometimes referred to as time-frequency resources).

Some wireless communication systems may support grant-based uplink transmissions. That is, if a UE wants to transmit data to a base station, the UE first requests the appropriate uplink resources from the base station. Once the base station has granted the requested uplink resources, the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may support configured grant (CG) uplink transmissions. That is, a UE may send uplink transmissions using certain uplink resources possibly shared with other UEs, without specifically requesting use of the resources and without specifically being granted the resources by the base station. A configured grant uplink transmission does not need a dynamic and explicit scheduling grant from the base station. A configured grant transmission is also sometimes known as a grant-free (GF) transmission.

A configured grant uplink transmission may be configured by radio resource control (RRC) signaling messages. The RRC signaling message may include one or more parameters, including one or more sets of parameters, for one or more UEs in order to pre-configure a configured grant uplink transmission.

Emerging 5G (e.g., New Radio or "NR") technology may be adapted for Ultra-Reliable Low Latency Communication (URLLC) and massive Machine Type Communications (mMTC). For example, factory automation involving a large number of UEs per cell generally demands a combination of high reliability and low latency, i.e. URLLC, which relies on technologies specified in the 3rd Generation Partnership Project Technical Specification (3GPP TS) 38.331, and 3GPP TS38.321. In addition, Uplink (UL) configured grant (CG) transmission is specified in 3GPP TS 38.331 Release 15 ("R15") and referred to as configured grant type 1. UL SPS transmission is also specified in R15 and referred to as configured grant type 2.

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In a V2X scenario, the transmission can be done through a link between the network and a UE, such as uplink (UL) and downlink (DL), or a sidelink (SL) between one UE and another UE. UE cooperation can be used to enhance the reliability, throughput, and capacity of V2X communications, as well as next generation wireless communications in general. SPS transmissions and CG transmissions may take place over a sidelink, for example between two UEs. Channel conditions and other parameters may change over time, more quickly than they are updated by RRC signaling, potentially causing a loss of efficiency due to the use of outdated configurations. However, signaling to dynamically update CG parameters can consume valuable bandwidth resources and may result in inefficient resource usage or loss of reliability, within the interval between configuration signaling, so improvements are desired.

SUMMARY

Example embodiments of the present disclosure provide a method and apparatus for communication between a communication device, such an access point or a wireless transmitting station, and multiple wireless receiving stations or devices.

In one aspect, a method for semi-persistent scheduling (SPS) and configured grant (CG) transmission parameters is provided. The method, which is performed by a communication device, includes the steps of: transmitting, to a user equipment (UE), a radio resource control (RRC) signal or activation downlink control information (DCI) signal for semi-persistent scheduling (SPS) or configured grant (CG) transmission configuration; and transmitting, to the UE, a physical layer control signal including an indication of one or more parameters for SPS or CG transmission. A high spectral efficiency may be achieved by including a limited number of parameters in this physical layer control signal, similar to the spectral efficiency achieved by dynamic scheduling grant, but without drawbacks caused by UE-specific DCI overhead and physical downlink control channel (PDCCH) blocking that are often encountered with dynamic-scheduling grant.

In some embodiments, the one or more parameters include at least one of a modulation and coding scheme (MCS), a time resource allocation, and a frequency resource allocation. In these embodiments, because other parameters, such as virtual resource block-to-physical resource block (VRB to PRB) mapping, PRB bundling size indicator, and rate matching indictor, that are not strongly affected by variance in the underlying wireless channel, have been already transmitted via the previous RRC or DCI signal, the payload size of the message in the physical layer control signal, which can be a group DCI message, is small compared to the typical DCI signal sent in a SPS transmission in 3GPP TS 38.331 Release 15 ("R15") or 3GPP TS 38.331 Release 16 ("R16").

In some embodiments, at least one of the RRC signal and the activation DCI signal, and the physical layer control signal are used by the UE to decode a message sent in a physical downlink shared channel (PDSCH) or to transmit a message through a physical uplink shared channel (PUSCH).

In some embodiments, the RRC signal includes a downlink (DL) semi-persistent scheduling (SPS) configuration information element (IE).

In some embodiments, the RRC signal includes an uplink (UL) configured grant (CG) IE.

In some embodiments, the physical layer control signal includes a Cyclic Redundancy Check (CRC) portion that is scrambled with a Configured Scheduling (CS)-Radio Network Temporary Identifier (RNTI) or an RNTI specifically for the physical layer control signal.

In some embodiments, the physical layer control signal is transmitted in group-common physical resources.

In some embodiments, the physical layer control signal includes a plurality of blocks, where each of the plurality of blocks corresponds to a respective UE from a plurality of UEs, and includes a respective indication for at least one parameter for the respective UE, or at least one indication that indicates a plurality of parameters for the respective UE.

In some embodiments, a block from the plurality of blocks includes X number of bits, where X is 1, 2 or 3.

In some embodiments, the size of a block, e.g., the number of bits, can be determined by a total number of parameters configured in the RRC signal or the activation DCI signal for the respective UE.

In some embodiments, the one or more parameters include at least one of the following parameters: time domain resource allocation, number of antenna ports, DeModulation Reference Signal (DMRS) sequence initialization, CSI request, downlink power offset, and transport block size (TBS), transmit power control (TPC) command for scheduled PUSCH, precoding information, a number of layers, number of antenna ports, a time offset for transmission opportunity.

In some embodiments, the RRC signal or the activation DCI signal includes at least one of the following parameters: time domain resource allocation, number of antenna ports, DeModulation Reference Signal (DMRS) sequence initialization, CSI request, downlink power offset, and transport block size (TBS).

In some embodiments, the RRC signal or activation DCI signal further includes at least one of the following parameters: time domain resource allocation, transmit power control (TPC) command for scheduled PUSCH, precoding information, a number of layers, number of antenna ports, a time offset for transmission opportunity.

In some embodiments, the indication for the one or more parameters in the physical layer control signal includes an index of one set from multiple sets of the one or more parameters.

In some embodiments, the indication for one or more parameters includes an absolute value for at least one of the one or more parameters.

In some embodiments, the indication for one or more parameters includes an incremental or decrement value for at least one of the one or more parameters.

In another aspect, a communication device is disclosed. The communication device including: a transceiver for sending or receiving a SPS or CG transmission; and a processing unit coupled to the transceiver, the processing unit being configured to execute instructions to cause the communication device to perform any one of the above mentioned methods.

In some embodiments, the communication device is a base station.

In some embodiments, the communication device is a user device.

In yet another aspect, an electronic device (ED) is disclosed. The ED includes: a transceiver for sending or receiving a wireless semi-persistent scheduling (SPS) or configured grant (CG) transmission; and a processing unit coupled to the transceiver, the processing unit being configured to execute instructions to: receive a radio resource control (RRC) or activation DCI signal for SPS or CG transmission configuration; receive a physical layer control signal including an indication of one or more parameters for SPS or CG configuration; and decode a message sent in a physical downlink shared channel (PDSCH), or transmit a message through a physical uplink shared channel (PUSCH), based on at least one of the RRC signal and the activation DCI signal and the physical layer control signal.

In some embodiments, the one or more parameters include at least one of a modulation and coding scheme (MCS) and a frequency resource allocation.

In some embodiments, the RRC signal includes a downlink (DL) semi-persistent scheduling (SPS) configuration information element (IE).

In some embodiments, the RRC signal includes an uplink (UL) configured grant (CG) IE.

In some embodiments, the physical layer control signal includes a Cyclic Redundancy Check (CRC) portion that is scrambled with a Configured Scheduling (CS)-Radio Network Temporary Identifier (RNTI) or an RNTI specifically for the physical layer control signal.

In some embodiments, the physical layer control signal is transmitted in group-common physical resources.

In some embodiments, the physical layer control signal includes a plurality of blocks, where each of the plurality of blocks corresponds to a respective UE from a plurality of UEs, and includes a respective indication for each of the one or more parameters for the respective UE, or at least one indication that indicates a plurality of parameters for the respective UE.

In some embodiments, the block has a size determined by a total number of parameters configured in the RRC signal or the activation DCI signal for the respective UE.

In some embodiments, the one or more parameters include at least one of the following parameters: time domain resource allocation, number of antenna ports, DeModulation Reference Signal (DMRS) sequence initialization, CSI request, downlink power offset, and transport block size (TBS), transmit power control (TPC) command for scheduled PUSCH, precoding information, a number of layers, number of antenna ports, a time offset for transmission opportunity.

In some embodiments, the RRC signal or the activation DCI signal includes at least one of the following parameters: time domain resource allocation, number of antenna ports, DeModulation Reference Signal (DMRS) sequence initialization, CSI request, downlink power offset, and transport block size (TBS).

In some embodiments, the RRC signal or activation DCI signal includes at least one of the following parameters: time domain resource allocation, transmit power control (TPC)

command for scheduled PUSCH, precoding information, a number of layers, number of antenna ports, a time offset for transmission opportunity.

In some embodiments, the value for the one or more parameters in the physical layer control signal includes an index of one set from multiple sets of the one or more parameters.

In some embodiments, the value for one or more parameters includes an absolute value for at least one of the one or more parameters.

In some embodiments, the value for one or more parameters includes an incremental or decrement value for at least one of the one or more parameters.

In yet another aspect, a method performed by a communication device is provided, the method comprising: transmitting, to a user equipment (UE), a radio resource control (RRC) signal or activation downlink control information (DCI) signal for semi-persistent scheduling (SPS) or configured grant (CG) transmission configuration; and transmitting, to the UE, a physical layer control signal comprising an indication of one or more parameters for SPS or CG transmission, the physical layer control signal comprising a Cyclic Redundancy Check (CRC) portion that is scrambled with a Radio Network Temporary Identifier (RNTI) specifically for the physical layer control signal, the one or more parameters comprising at least one of a modulation and coding scheme (MCS) and a frequency resource allocation, wherein the physical layer control signal is a group-common physical signalling.

In some embodiments, the MCS value is sent in a modulation and coding scheme field in the RRC signal or the activation DCI signal that determines a modulation order and a target code rate based on a predefined table from a plurality of predefined tables, wherein the predefined table from the plurality of predefined tables is determined based on the MCS value in the RRC and activation DCI signal.

In some embodiments, at least one of the RRC signal and the activation DCI signal, and the physical layer control signal are used by the UE to decode a message sent in a physical downlink shared channel (PDSCH) or to transmit a message through a physical uplink shared channel (PUSCH).

In some embodiments, the RRC signal comprises a downlink (DL) semi-persistent scheduling (SPS) configuration information element (IE) or an uplink (UL) configured grant (CG) IE.

In some embodiments, the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

In some embodiments, the one or more parameters comprise at least one of the following parameters: time domain resource allocation, number of antenna ports, DeModulation Reference Signal (DMRS) sequence initialization, CSI request, downlink power offset, and transport block size (TBS), transmit power control (TPC) command for scheduled PUSCH, precoding information, a number of layers, number of antenna ports, a time offset for transmission opportunity.

In some embodiments, the indication for the one or more parameters in the physical layer control signal comprises one set from multiple sets of the one or more parameters, and wherein the one set is for a selected available MCS, the selected available MCS being indicated by a number of bits in the RRC or the activation DCI signal, the number of bits being less than another number of bits for indicating the multiple sets, the multiple sets being all available MCS.

In yet another aspect, a communication device is provided, the communication device comprising: a transceiver; and a processing unit coupled to the transceiver, the processing unit being configured to execute instructions to cause the transceiver to: transmit to a user equipment (UE), a radio resource control (RRC) signal or activation downlink control information (DCI) signal for semi-persistent scheduling (SPS) or configured grant (CG) transmission configuration; and transmit to the UE, a physical layer control signal comprising an indication of one or more parameters for SPS or CG transmission, the physical layer control signal comprising a Cyclic Redundancy Check (CRC) portion that is scrambled with a Radio Network Temporary Identifier (RNTI) specifically for the physical layer control signal, the one or more parameters comprising at least one of a modulation and coding scheme (MCS) and a frequency resource allocation, wherein the physical layer control signal is a group-common physical signalling.

In some embodiments, the MCS value is sent in a modulation and coding scheme field in the RRC signal or the activation DCI signal that determines a modulation order and a target code rate based on a predefined table from a plurality of predefined tables, wherein the predefined table from the plurality of predefined tables is determined based on the MCS value in the RRC and activation DCI signal.

In some embodiments, at least one of the RRC signal and the activation DCI signal, and the physical layer control signal are used by the UE to decode a message sent in a physical downlink shared channel (PDSCH) or to transmit a message through a physical uplink shared channel (PUSCH).

In some embodiments, the RRC signal comprises a downlink (DL) semi-persistent scheduling (SPS) configuration information element (IE) or an uplink (UL) configured grant (CG) IE.

In some embodiments, the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

In some embodiments, the one or more parameters comprise at least one of the following parameters: time domain resource allocation, number of antenna ports, DeModulation Reference Signal (DMRS) sequence initialization, CSI request, downlink power offset, and transport block size (TBS), transmit power control (TPC) command for scheduled PUSCH, precoding information, a number of layers, number of antenna ports, a time offset for transmission opportunity.

In some embodiments, the indication for the one or more parameters in the physical layer control signal comprises one set from multiple sets of the one or more parameters, and wherein the one set is for a selected available MCS, the selected available MCS being indicated by a number of bits in the RRC or the activation DCI signal, the number of bits being less than another number of bits for indicating the multiple sets, the multiple sets being all available MCS.

In yet another aspect, a method performed by a communication device is provide, the method comprising: receiving by a user equipment (UE), a radio resource control (RRC) signal or activation downlink control information (DCI) signal for semi-persistent scheduling (SPS) or configured grant (CG) transmission configuration; and receiving by the UE, a physical layer control signal comprising an indication of one or more parameters for SPS or CG transmission, the physical layer control signal comprising a Cyclic Redundancy Check (CRC) portion that is scrambled with a Radio Network Temporary Identifier (RNTI) specifically for the physical layer control signal, the one or more parameters comprising at least one of a modulation and coding scheme (MCS) and a frequency resource allocation, wherein the physical layer control signal is a group-common physical signalling.

In some embodiments, the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

In some embodiments, the indication for the one or more parameters in the physical layer control signal comprises one set from multiple sets of the one or more parameters, and wherein the one set is for a selected available MCS, the selected available MCS being indicated by a number of bits in the RRC or the activation DCI signal, the number of bits being less than another number of bits for indicating the multiple sets, the multiple sets being all available MCS.

In yet another aspect, a communication device is provided, the communication device comprising: a transceiver; and a processing unit coupled to the transceiver, the processing unit being configured to execute instructions to cause the transceiver to: receive by a user equipment (UE), a radio resource control (RRC) signal or activation downlink control information (DCI) signal for semi-persistent scheduling (SPS) or configured grant (CG) transmission configuration; and receive by the UE, a physical layer control signal comprising an indication of one or more parameters for SPS or CG transmission, the physical layer control signal comprising a Cyclic Redundancy Check (CRC) portion that is scrambled with a Radio Network Temporary Identifier (RNTI) specifically for the physical layer control signal, the one or more parameters comprising at least one of a modulation and coding scheme (MCS) and a frequency resource allocation, wherein the physical layer control signal is a group-common physical signalling.

In some embodiments, the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

In some embodiments, the indication for the one or more parameters in the physical layer control signal comprises one set from multiple sets of the one or more parameters, and wherein the one set is for a selected available MCS, the selected available MCS being indicated by a number of bits in the RRC or the activation DCI signal, the number of bits being less than another number of bits for indicating the multiple sets, the multiple sets being all available MCS.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
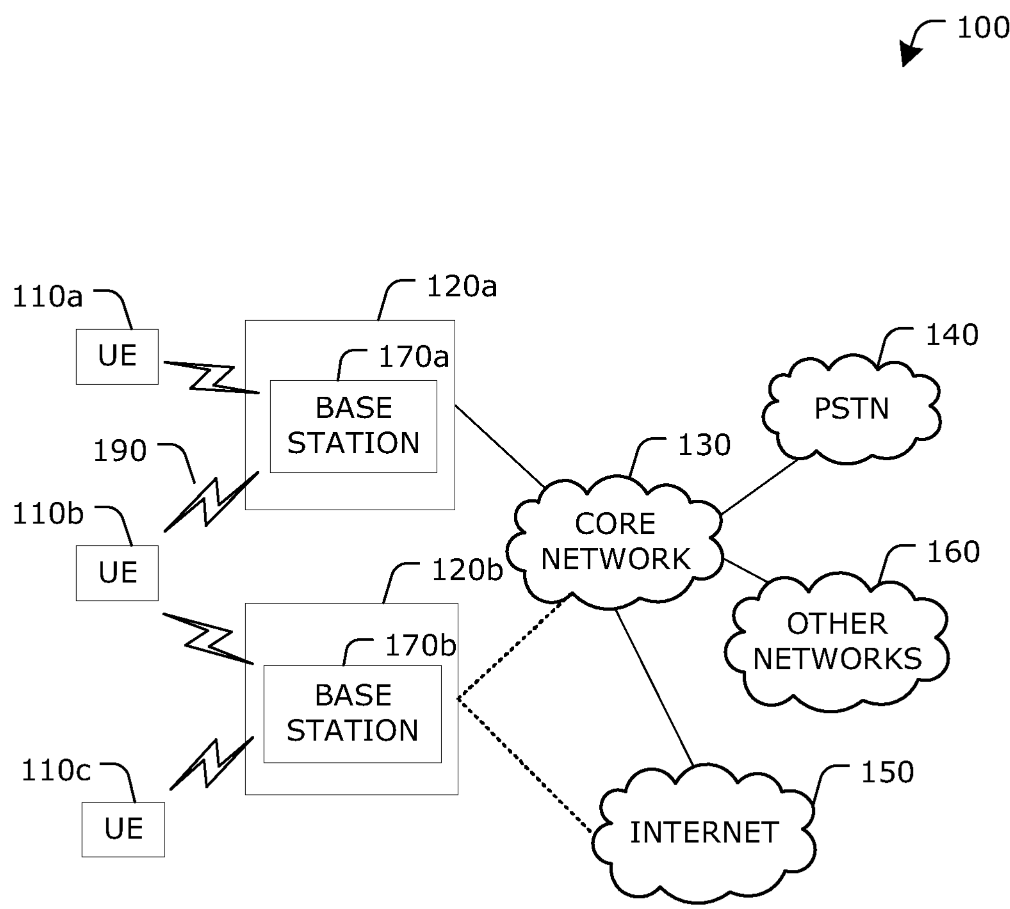
FIG. 1 is a schematic diagram of an example communication system suitable for implementing examples described herein.

FIG. 1 illustrates an example communication system 100 in which embodiments of the present disclosure could be implemented. In general, the communication system 100 enables multiple wireless or wired elements to communicate data and other content. The communication system 100 may enable content (e.g., voice, data, video, or text) to be communicated (e.g., via broadcast, narrowcast, or user device to user device) among entities of the system 100. The communication system 100 may operate by sharing resources such as bandwidth.

In this example, the communication system 100 includes user devices (ED) 110*a*-110*c* (which may be generically referred to as ED 110), radio access networks (RANs) 120*a*-120*b* (generically referred to as RAN 120), a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110 are configured to operate, communicate, or both, in the communication system 100. For example, the EDs 110 are configured to transmit, receive, or both via wireless or wired communication channels. Each ED 110 represents any suitable end user device for wireless operation and may include such devices (or may be referred to) as a user equipment or device (UE), a wireless transmitting or receiving unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, or a consumer electronics device, among other possibilities.

In FIG. 1, the RANs 120 include base stations (BS's) 170*a*,170*b* (which may be generically referred to as BS 170), respectively. Each BS 170*a*, 170*b* is configured to wirelessly interface with one or more of the EDs 110 to enable access to any other BS 170, the core network 130, the PSTN 140, the internet 150, or the other networks 160. For example, the BS 170*s* may include (or be) one or more of several well-known devices, such as a base transceiver station (BTS), a radio base station, a Node-B (NodeB), an evolved NodeB (eNodeB), a Home eNodeB, a gNodeB (sometimes called a "gigabit" Node B or a "gNB"), a transmission point (TP), a transmit and receive point (TRP), a site controller, an access point (AP), or a wireless router, among other possibilities. Any ED 110 may be alternatively or additionally configured to interface, access, or communicate with any other BS 170, the internet 150, the core network 130, the PSTN 140, the other networks 160, or any combination of the preceding. The communication system 100 may include RANs, such as RAN 120*b*, where the corresponding BS 170*b* accesses the core network 130 via the internet 150, as shown.

The EDs 110 and BS's 170*a*, 170*b* are examples of communication equipment that can be configured to implement some or all of the functionality or embodiments described herein. In the embodiment shown in FIG. 1, the BS 170*a* forms part of the RAN 120*a*, which may include other BS's, base station controller(s) (BSC), radio network controller(s) (RNC), relay nodes, elements, or devices. Any BS 170*a*, 170*b* may be a single element, as shown, or multiple elements, distributed in the corresponding RAN, or otherwise. Also, the BS 170*b* forms part of the RAN 120*b*, which may include other BS's, elements, or devices. Each BS 170*a*, 170*b* transmits or receives wireless signals within a particular geographic region or area, sometimes referred to as a "cell" or "coverage area". A cell may be further divided into cell sectors, and a BS 170*a*, 170*b* may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The BS's 170*a*, 170*b* communicate with one or more of the EDs 110 over one or more air interfaces 190 using wireless communication links (e.g. radio frequency (RF), microwave, or infrared). The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A BS 170*a*, 170*b* may implement Universal Mobile Telecommunication System (UMTS) Terrestrial Radio Access (UTRA) to establish an air interface 190 using wideband CDMA (WCDMA). In doing so, the BS 170*a*, 170*b* may implement protocols such as HSPA, HSPA+ optionally including HSDPA, HSUPA or both. Alternatively, BS 170*a*, 170*b* may establish an air interface 190 with Evolved UTMS Terrestrial Radio Access (E-UTRA) using LTE, LTE-A, or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120 are in communication with the core network 130 to provide the EDs 110 with various services such as voice, data, and other services. The RANs 120 or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110 may be multimode devices capable of operation according to multiple radio access technologies, and incorporate multiple transceivers necessary to support such.

Figure 2A:
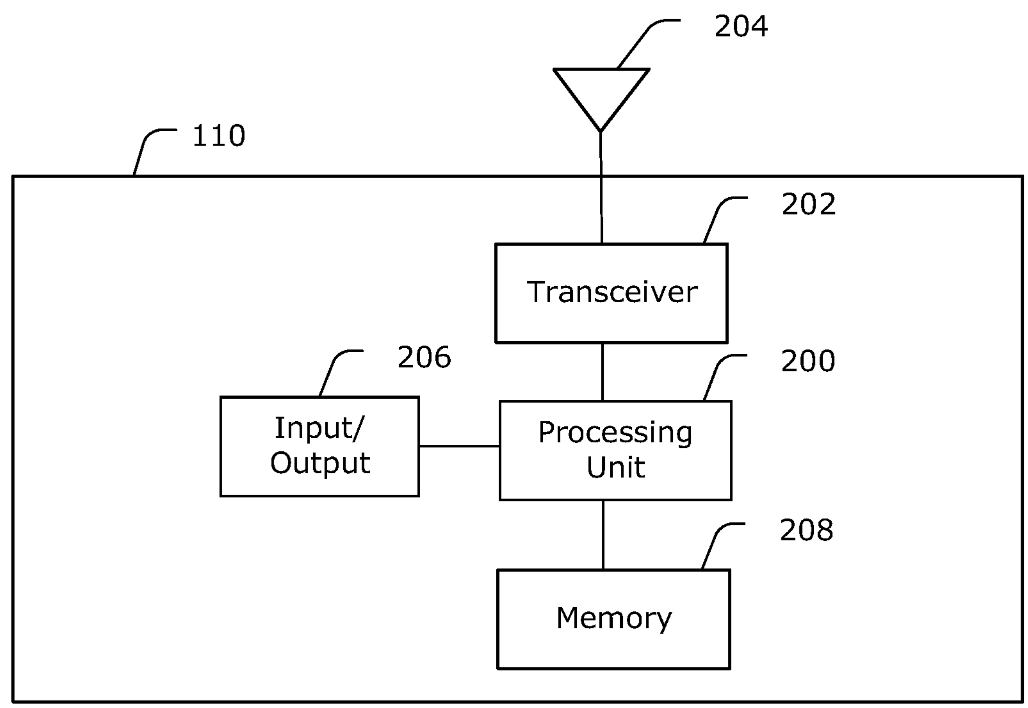
FIGS. 2A and 2B are block diagrams showing an example electronic device and an example base station, respectively, suitable for implementing examples described herein.
Figure 2B:
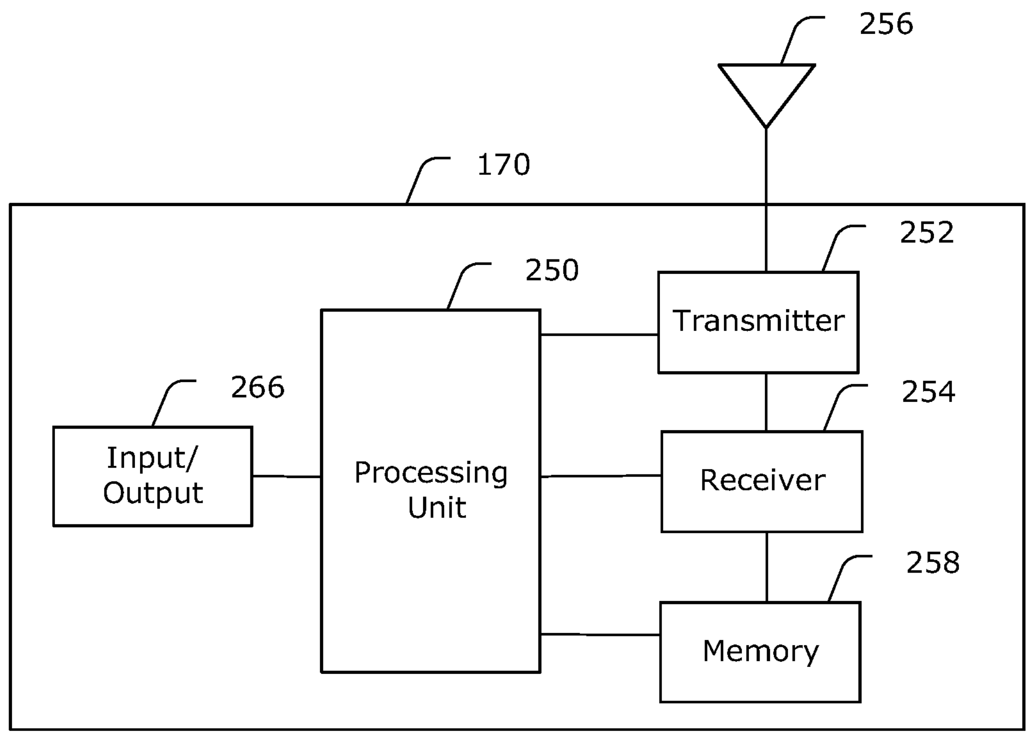

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input or output processing, or any other functionality enabling the ED 110 to operate in the communication system 100. The processing unit 200 may also be configured to implement some or all of the functionality or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission or processing signals received wirelessly or by wire. Each antenna 204 includes any suitable structure for transmitting or receiving wireless or wired signals. One or multiple transceivers 202 could be used in the ED 110. One or multiple antennas 204 could be used in the ED 110. In some examples, one or more antennas 204 may be an array antenna 204, which may be used to perform beamforming and beam steering operations. Although shown as a single functional unit, a transceiver 202 could also be implemented using at least one transmitter and at least one separate receiver.

The ED 110 further includes one or more input or output devices 206 or input or output interfaces (such as a wired interface to the internet 150). The input or output device(s) 206 permit interaction with a user or other devices in the network. Each input or output device 206 includes any suitable structure for providing information to or receiving information from a user, such as a speaker, microphone, keypad, keyboard, display, or touchscreen, including network interface communications.

In addition, the ED 110 includes at least one memory 208. The memory 208 stores instructions and data used, generated, or collected by the ED 110. For example, the memory 208 could store software instructions or modules configured to implement some or all of the functionality or embodiments described herein and that are executed by the processing unit(s) 200. Each memory 208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input or output interfaces 266. A scheduler 253 may be coupled to the processing unit 250. The scheduler 253 may be included within or operated separately from the base station 170. The processing unit 250 implements various processing operations of the base station 170, such as signal coding, data processing, power control, input or output processing, or any other functionality. The processing unit 250 can also be configured to implement some or all of the functionality or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs 110 or other devices. Each receiver 254 includes any suitable structure for processing signals received wirelessly or by wire from one or more EDs 110 or other devices. Although shown as separate components, at least one transmitter 252 and at least one receiver 254 could be combined into a transceiver. Each antenna 256 includes any suitable structure for transmitting or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an array antenna, which may be used for beamforming and beam steering operations. Each memory 258 includes any suitable volatile or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality or embodiments described herein and that are executed by the processing unit(s) 250.

Each input or output interface 266 permits interaction with a user or other devices in the network. Each input or output interface 266 includes any suitable structure for providing information to, or receiving information from a user, including network interface communications.

Referring back to FIG. 1, in an example, the ED 110 sends a communication to the BS 170 over the air interface 190, in a CG uplink (UL) transmission. Generally speaking, based on standards described in 3GPP TS38.331, the information element (IE) ConfiguredGrantConfig is used to configure uplink transmission without dynamic grant under one of two schemes. The actual uplink transmission may either be configured via RRC (CG type 1) or provided by both DCI and RRC signaling (CG type 2). In the case of CG type 2, the DCI scrambled by Configured Scheduling (CS)-Radio Network Temporary Identifier (RNTI) is sent through physical downlink control channel (PDCCH). If DCI is used to transmit one or more CG communication parameters and indicate that the ED may perform uplink CG transmissions, the DCI is known as an activation DCI signal.

A CG UL transmission is an UL transmission (i.e., in the direction from the ED 110 to the BS 170) that is sent using UL resources configured by RRC signaling or by transmitting physical layer control information, such as activation DCI, to the ED 110 by the BS 170. A CG UL transmission does not need a dynamic and explicit scheduling grant from the BS 170. In some examples, the BS 170 may similarly send a SPS downlink (DL) transmission to the ED 110 over the air interface 190. A SPS DL transmission is a DL transmission (i.e., in the direction from the BS 170 to the ED 110) that is sent using resources for each transmission that are not explicitly scheduled using dynamic signaling. Because CG does not use dynamic scheduling, some communication parameters such as MCS and frequency resource allocation are configured by RRC, unlike in grant-based communications. It is contemplated that the embodiments disclosed herein may be used in sidelink communication, in which case the RRC signaling would be sent from one ED to one or more other EDs, and the physical layer control information would be sent from one ED to one or more other EDs using sidelink control information (SCI) in a physical sidelink control channel (PSCCH).

CG transmissions are sometimes referred to as "grant-less transmissions", "schedule free transmissions", "schedule-less transmissions", or "configured grant transmissions" (in the sense that the resources used for each transmission are semi-statically configured or indicated by scheduling activation PDCCH but not dynamically scheduled).

In a CG UL transmission, different EDs 110 may send UL transmissions using UL time-frequency resources shared by the EDs 110, without specifically requesting use of the resources and without dynamic signaling from BS 170. In some cases, more than one ED 110 may be allocated the same designated resources for CG UL transmissions, in which case the CG UL transmissions are contention-based transmissions, because the possibility exists for more than one UEs to contend for use of the same resource. CG UL transmissions may be suitable for transmitting bursty traffic with short packets from the ED 110 to the BS 170, or for transmitting data to the BS 170 in real-time or with low-latency, such as in the case of Ultra-Reliable Low Latency Communication (URLLC). An advantage of CG transmission is low latency resulting from not having to request and receive a dynamic grant for an allocated time slot from the BS 170. Furthermore, in a CG transmission, the scheduling overhead may be reduced.

The UL resources on which CG UL transmissions are sent may be referred to as "CG UL resources". The resources that may be used by the EDs 110 for CG UL transmission may be preconfigured, for example via using semi-static signaling, such as by radio resource control (RRC) signaling. The CG UL resources may be static or may be configured semi-statically. Semi-statically configured communication is sometimes referred to as SPS. A SPS configuration means the configuration is updated or changed on a relatively long time period, such as once in many frames or updated only as needed. A semi-static configuration differs from a dynamic configuration in that a semi-static configuration does not get updated or changed as often as a dynamic configuration. For example, a dynamic configuration may be updated or changed every subframe or slot, or every few subframes or slots (e.g., using dynamic signaling, such as downlink control information (DCI) signals), and a semi-static configuration may be updated or changed once every several frames, once every few seconds, or only if needed.

The EDs 110 may process and use the designated set of resources specified in the RRC or DCI signal to send their CG UL transmissions, but the BS 170 does not know which of the EDs 110, if any, are going to send a CG UL transmission, and using which of the designated resources.

To support CG transmissions, the associated resources configured for an ED 110 or a group of EDs 110 can include any, some or all of the following, including combinations thereof: frequency resources, time resources, reference signal (RS) or RS configuration, hopping parameters, hybrid automatic repeat request (HARQ) process IDs, modulation and coding schemes (MCSs), number of GF transmission repetitions, power control parameters, and other parameters, such as information associated with general grant-based data and control transmissions.

In an example, a physical resource block (PRB) scheme is provided by the RRC or DCI signaling. The PRB scheme may indicate a physical starting frequency resource block (RB) and size of the RB.

In another example, the RRC or DCI signaling may include time resources including starting or ending position of a data transmission time interval. Time resources can be one symbol, mini-slot, or slot.

In yet another example, each ED 110 can be configured with one or more reference signals (e.g. demodulation reference signals (DMRSs)) depending on scenarios involved. For a group of EDs 110, each ED 110 may or may not have a different RS or have a different set of RSs.

In one example, one or more hopping parameters specific to an ED 110 or group of EDs 110, which may include a hopping pattern cycle period (e.g., defined by a time period or by a number of hopping times), can be included in the RRC or DCI signaling. Other parameters in the CG UL transmissions may include a hopping pattern index or indices. Each ED 110 may have one or more hopping pattern indices.

In another example, the RRC or DCI signaling may include one or more hybrid automatic repeat request (HARQ) process IDs per ED 110.

In yet another example, the RRC or DCI signaling may include one or more modulation and coding schemes (MCSs) per ED 110. The ED 110 can indicate explicitly or implicitly which MCS to use for a CG transmission.

In one example, the RRC or DCI signaling may include a number of GF transmission repetitions, which may be represented by K. One or more K values can be configured for an ED 110. Which K value to use may depend on, for example, channel conditions, service types, and so on.

In another example, the RRC or DCI signaling may include power control parameters, including power ramping step size (e.g., for an ED 110).

Referring again to FIG. 1, in some embodiments, an ED 110 may operate in grant-based transmission mode and may have dedicated resources for making a contention-free scheduling request. When the scheduling request is received by the BS 170, the BS 170 transmits a grant to the ED 110 that grants uplink resources for the ED 110 to transmit data via a grant-based uplink transmission. In some embodiments, an ED 110 may send a contention-based scheduling request, e.g. as a configured grant uplink transmission, as described above. When the contention-based scheduling request is received by the BS 170, the BS 170 transmits a grant to the ED 110 that grants uplink resources for the ED 110 to transmit data via a grant-based uplink transmission. Alternatively, in some embodiments, an ED 110 may send a configured grant uplink data transmission to the BS 170, via PUSCH. In response, the BS 170 may grant to uplink resources for the ED 110 to transmit additional data via a grant-based uplink transmission. The additional data may be a retransmission of the data in the configured grant uplink message. Alternatively, the additional data may be or include new data that the ED 110 has to transmit to BS 170, in which case the configured grant uplink transmission may include a buffer status report (BSR) indicating that the ED 110 has additional data to send.

In all of the different scenarios discussed in the paragraph above, the BS 170 sends a grant to the ED 110. In some embodiments, the grant may be a semi-persistent grant in the case of semi-persistent scheduling (SPS). A semi-persistent grant is a grant that schedules more than one transmission, e.g. a pattern of transmissions. As an example, a semi-persistent grant may grant a particular resource hopping pattern or particular reference signal hopping pattern for a set time or interval, or until the ED 110 receives further signaling. Generally speaking, SPS can be configured or re-configured by an RRC signal at any time using a SPS configuration message SPS-Config. SPS-Config may be referred to as an information element (IE) and includes the configuration for semiPersistSchedC-RNTI (sps-CRNTI), sps-ConfigDL and sps-ConfigUL. SPS can be configured in either or both UL and DL directions. In some embodiments, after configuration, SPS needs to be activated (e.g. via a subsequent DCI signal) by BS 170 for the ED 110 to start using SPS grants and assignments.

Under NR Release 15 (as specified in 3GPP TS38.331, and 3GPP TS38.321), the SPS-Config information element is used to configure downlink semi-persistent transmission. A BS 170 may, via RRC signaling, transmit one or more selected parameters in a SPS configuration message (e.g. SPS-config information element) for each SPS configuration, or in a Configured Grant (CG) message (e.g. ConfiguredGrantConfig information element) for each UL CG configuration. The selected parameters are generally related to the wireless channel. For example, when configured grant resource configurations are configured for an ED 110 via RRC signaling only (type 1) or by RRC plus physical layer control signaling such as DCI (type 2), the configuration information is provided by activation DCI sent through physical downlink control channel (PDCCH). Each CG resource configuration may have different parameter values. Each CG resource configuration may include a unique resource configuration index for the ED 110 in a cell or one network area with multiple cells. For example, each CG resource configuration transmission can include an MCS or frequency resource allocation.

There are several drawbacks with existing SPS or CG resource configurations. For example, DL SPS in R15 or R16 typically needs a DCI sent through PDCCH to activate SPS transmission. In a URLLC scenario, the DCI overhead for large numbers of UEs (e.g. 100 or more) can be significant. As shown by a simulation, the number of control channel elements (CCEs) for each DCI is at least 4-8, which translate to 24-48 resource blocks (RBs) for DCI in NR. Moreover, the scheduling decision and DCI transmission performed by a base station 170 in the conventional approach cause latency for data transmission because the data transmission is only transmitted after receiving the activation DCI signal. PDCCH blocking may also occur when there are a large number of activation DCI signals on PDCCH, or a large number of DCI signals on PDCCH to schedule retransmissions of previous CG transmission, that arrive at the same time for a group of UEs.

In addition, in the case of SPS grant or assignment within a wireless channel that has highly dynamic characteristics, various channel parameters such as MCS, time or frequency domain resource allocation, and spatial allocation in SPS or CG may need to be updated dynamically based on channel conditions, which means that the channel parameters may need to be updated more quickly than the update schedule of a SPS configuration. This can lead to poor spectral efficiency. In some conventional cases, multiple CG or SPS configurations with different MCS, or different time and frequency resource domains may be reused to address the mismatch between SPS grant or assignment and the dynamically variable wireless channel, for example up to 8 or 12 configurations. However, it can increase complexity and cause potential delay and errors if an ED 110 has to blindly detect or decode potential data transmissions using multiple resource configurations even if only one data transmission is transmitted in a particular time slot.

In some implementations, such as factory automation, nearly 100% of UEs must meet the reliability and latency requirements, because even one or two failures could result in significant costs or loss of productivity. The performance of multiple UEs per cell has been evaluated in a simulation. The table below shows the ratio of UEs satisfying 1 ms latency and 99.9999% reliability.

| | 10 UE per cell | 20 UEs per cell | 40 UEs per cell |
|---|---|---|---|
| DL/GB | 96.7% | 98% | 74% |
| UL/CG | 90.8% | 68% | 41% |

The performance of multiple UEs in a cell may be improved if the MCS, time domain resource allocation, and frequency domain resource allocation can be determined and adapted dynamically by the UEs based on the changing characteristics of their own wireless channel. In addition, even though dynamic scheduling can better capture the wireless channel characteristics and support more UEs, UE-specific dynamic grant or assignment requires higher DCI overhead and occupies DL resources which can be otherwise used for data transmission.

In some embodiments, considering a group DCI reliability requirement and overhead, a DCI payload size of the group DCI should be set to be less than a certain value. For example, the DCI payload size may be set to 40 bits not including Cyclic Redundancy Check (CRC) bits. However in at least some cases, 40 bits are not enough for all the resource parameters that would need to be configured, and it is difficult to update all the parameters in any one of DCI formats 0-1, 1-1, 0-0, 1-1 for data transmission in one DCI with limited payload size for a group of UEs.

Figure 3:
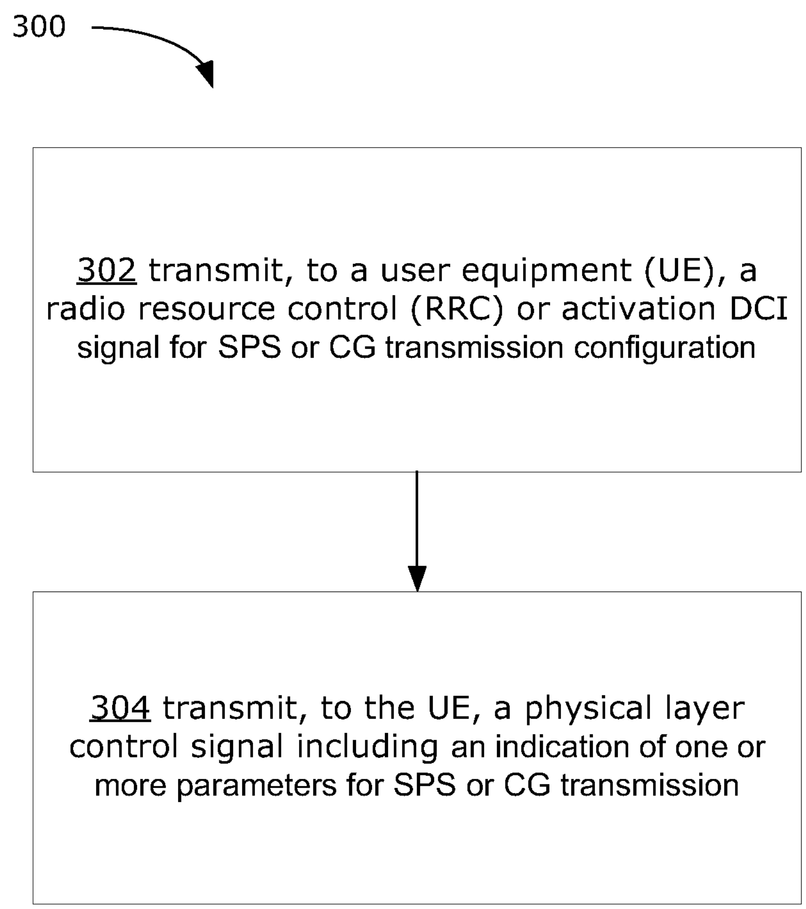
FIG. 3 is a flowchart illustrating an example method performed by a base station for a SPS or CG configuration in accordance with an example embodiment.

FIG. 3 is a flowchart illustrating an example method 300 performed by a communication device to achieve a SPS or CG resource configuration. The communication device may be a BS 170 in some embodiments. In other embodiments, the communication device may be an ED 110 in a sidelink control communication scenario.

At 302, the communication device transmits a radio resource control (RRC) or DCI signal including one or more parameters for transmission configuration. In some embodiments, the one or more parameters may include at least one of: a modulation and coding scheme (MCS) and a frequency resource allocation. The MCS value may be sent in a modulation and coding scheme field ($I_{MCS}$) in the RRC or DCI signal to determine a modulation order ($Q_m$) and target code rate (R) based on a predefined table.

At 304, the communication device transmits, through a physical layer channel, a physical layer control signal including a value for one or more parameter for transmission configuration. The physical layer control signal can be carried in a DCI signal or a sidelink control information (SCI) signal.

In some embodiments, the one or more parameters in the physical layer control signal includes at least one of: the modulation and coding scheme (MCS) and the frequency resource allocation.

In some embodiments, the communication device transmits the physical layer control signal via a physical layer channel such as PDCCH or PUCCH, the control signal may include indication of one or more parameters which may be updated for SPS or CG configuration. When the total number of the one or more parameters included in the physical layer control signal is relatively small (e.g., only 2 or 3 parameters), the overall size of the message carried by the physical layer control signal can be small enough that a high spectral efficiency may be achieved, similar to the spectral efficiency achieved by dynamic scheduling grant, but without drawbacks caused by UE-specific DCI overhead and physical downlink control channel (PDCCH) blocking that are often encountered with dynamic-scheduling grant.

In some embodiments, the indication of one or more parameters includes index of one or more values configured for one or more parameters in the RRC signal. For example, one or more MCS may be assigned an index and included in the physical layer control signal, and when only 4 indices are included (e.g. index of 0-3), only 2 bits are required to indicate the MCS, which saves signaling overhead compared to the 5 bits required to indicate one of 32 values.

In some embodiments, the indication of one or more updated parameters includes a respective value for at least one of one or more parameters.

In some embodiments, the one or more parameters in the physical layer control signal include at least one of the following parameters: time domain resource allocation, number of antenna ports, DeModulation Reference Signal (DMRS) sequence initialization, CSI request, downlink power offset, and transport block size (TBS), transmit power control (TPC) command for scheduled PUSCH, precoding information, a number of layers, number of antenna ports, a time offset for transmission opportunity.

Using the RRC signal, and the DCI signal in the case of CG type 2, as well as the control information via the physical layer for the one or more parameters, an ED 110 such as a UE can decode a message sent in a physical downlink shared channel (PDSCH) or transmit a message through a physical uplink shared channel (PUSCH). In this case, because other parameters, such as virtual resource block-to-physical resource block (VRB to PRB) mapping, PRB bundling size indicator, and rate matching indictor, that are not strongly affected by variance in the underlying wireless channel are already transmitted via a previous RRC signal, the payload size of the subsequent DCI message, which can be a group DCI message, is thereby small or reduced.

In some embodiments, the physical layer control signal includes a CRC portion that is scrambled with a Configured Scheduling (CS)-Radio Network Temporary Identifier (RNTI) or an RNTI specifically for the physical layer control signal. For example, the RNTI may be one of Transmit Power Control-PUCCH—RNTI (TPC-PUSCH-RNTI), Transmit Power Control-PUSCH—RNTI (TPC-PUCCH-RNTI), Transmit Power Control-Sounding Reference Symbols—RNTI (TPC-SRS-RNTI), or Semi-Persistent CSI RNTI. Generally speaking, Transmit Power Control RNTI (TPC RNTI) is used for uplink power control purpose. TPC RNTI may be TPC-PUSCH-RNTI, TPC-PUCCH-RNTI or TPC-SRS-RNTI. Normally TPC RNTI is assigned to a group of UEs. The base station 170 may configure the UE with TPC-PUSCH-RNTI, TPC-PUCCH-RNTI and TPC-SRS-RNTI via higher layer signaling (e.g., RRC). A RNTI can be a 16-bit identifier, and may have a specific value or a range depending on the type of RNTI. Each RNTI and its corresponding value or range may be found in 3GPP TS38.321.

The DCI signal includes multiple blocks. Each block may correspond to a respective UE in a group of UEs, and includes an indication of the updated parameters for the respective UE. Alternatively, two or more blocks can correspond to a single UE, if the UE is configured with multiple CG or SPS configurations. A block can have a size of defined by X number of bits. X can be, in some embodiments, determined by a total number of updated parameters for the respective UE. For example, 1 bit of control information may include information for up to two parameters, 2 bits of control information may include information for up to four parameters, 3 bits of control information may include information for up to eight parameters, and so on. For example, there are two states (i.e., “1” and “0”) represented by 1 bit of control information, the first state “1” can indicate a first parameter, and the second state “0” can indicate a second parameter.

In some embodiments, if the information carried in the physical layer control signal is not received or decoded successfully by the UE, the UE can use information from the transmitted parameters in the RRC or activation DCI signal to decode a message sent in a physical downlink shared channel (PDSCH) or to transmit a message through a physical uplink shared channel (PUSCH).

In some embodiments, the physical layer control signal is transmitted in group-common physical resources, such as in a group-common PDCCH.

In some embodiments, the physical layer control signal includes a plurality of blocks, where each of the plurality of blocks corresponds to a respective UE and includes a respective indication for each of the one or more parameters for the respective UE.

In some embodiments, a block in the plurality of blocks has a size of X bits, where X can be determined by a total number of parameters configured in the RRC signal or the activation DCI signal for the respective UE. For example, 1 bit of control information may include information for up to two parameters, 2 bits of control information may include information for up to four parameters, 3 bits of control information may include information for up to eight parameters, and so on. For example, there are two states (i.e., “1” and “0”) represented by 1 bit of control information, the first state “1” can indicate a first parameter, and the second state “0” can indicate a second parameter.

In some embodiments, the RRC signal includes a downlink (DL) semi-persistent scheduling (SPS) or CG configuration information element (IE). The RRC signal or physical control signal may further include information regarding at least one of the following parameters: time domain resource allocation, number of antenna ports, DeModulation Reference Signal (DMRS) sequence initialization, CSI request, downlink power offset, and transport block size (TBS).

MCS, available time and frequency domain resources, and the number of layers for transmission are used to determine the TBS. Therefore, if a TBS is fixed, and MCS are updated, then at least one of: time domain resource allocation, frequency domain resource allocation, and the number of layers may be updated accordingly.

For example, the table below shows index numbers and corresponding example TBS values for when TBS is less than or equal to 3824.

| Index | TBS | Index | TBS | Index | TBS | Index | TBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |
| 4 | 48 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |
| 12 | 112 | 42 | 576 | 72 | 1928 | | |
| 13 | 120 | 43 | 608 | 73 | 2024 | | |
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2536 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 85 | 2856 | | |
| 26 | 256 | 56 | 1128 | 86 | 2976 | | |
| 27 | 272 | 57 | 1160 | 87 | 3104 | | |
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

In some embodiments, the RRC signal includes an uplink (UL) configured grant (CG) IE. The RRC signal or DCI signal may further include information regarding at least one of the following parameters: time domain resource allocation, transmit power control (TPC) command for scheduled PUSCH, precoding information, a number of layers, number of antenna ports, and a time offset for transmission opportunity.

In some embodiments, the one or more parameters in the physical layer control signal may include absolute values for the updated parameters, which can replace the values previously transmitted for the corresponding parameters in the RRC or DCI signal. A new set of indexes may be assigned to a subset of available values for MCS Index, as shown in the tables below.

| Index | MCS Index $I_{MCS}$ |
|---|---|
| 0 | Integer A, (0 . . . 31) |
| 1 | Integer B, (0 . . . 31) |
| 2 | Integer C, (0 . . . 31) |
| 3 | Integer D, (0 . . . 31) |

To determine the modulation order, target code rate in the physical downlink shared channel or PUSCH, a UE may first read the modulation and coding scheme field ($I_{MCS}$) in the DCI or RRC signaling or physical control signaling to determine a modulation order ($Q_m$) and target code rate (R) based on a table, which may be one of the following tables. In some embodiments, the UE may determine the correct table to use, for example based on the information in the RRC or activation DCI signal. In the above example, 4 of the 32 available MCS as shown below are selected for use in an updated signal (which may be, for example, an updated DCI signal or physical layer control signal), and are each assigned an index from 0 to 3. As a result, only 2 bits are required to indicate the updated MCS, which saves signaling overhead compared to the 5 bits required to indicate one of 32 values.

MCS index table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

MCS index table 2 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

MCS index table 3 for PDSCH and PUSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

MCS index table for PUSCH with transform precoding and 64QAM

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |

-continued

MCS index table for PUSCH with transform precoding and 64QAM

| MCS Index $I_{MCS}$ | Modulation Order $Q_m$ | Target code Rate R × 1024 | Spectral efficiency |
|---|---|---|---|
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

MCS index table 2 for PUSCH with transform precoding and 64QAM

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

In some embodiments, the information regarding the updated set of parameters in the physical layer control signal may include incremental values for the updated parameters, such as a delta or offset value. The delta or offset values can be used to calculate an absolute value by adding the incremental value to, or subtracting it from, a previous value of the corresponding parameter as set in the RRC signal, or by incrementing or decrementing the index value of the previously used parameter.

A set of indexes may be assigned to various combinations of parameters (e.g., MCS, frequency domain resource allocation, time domain resource allocation) as shown in the tables below. In some embodiments, two or more rows in the table may share a common frequency allocation or a common MCS, as long as the other parameter is different.

| Index | frequencyDomainAllocation | MCS |
|---|---|---|
| 0 | Bit string 1(size 18) | Integer A, (0 . . . 31) |
| 1 | Bit string 2(size 18) | Integer B, (0 . . . 31) |
| 2 | Bit string 3(size 18) | Integer C, (0 . . . 31) |
| 3 | Bit string 4(size 18) | Integer D, (0 . . . 31) |
| 4 | Bit string 5(size 18) | Integer E, (0 . . . 31) |
| 5 | Bit string 6(size 18) | Integer F, (0 . . . 31) |
| 6 | Bit string 7(size 18) | Integer G, (0 . . . 31) |
| 7 | Bit string 8(size 18) | Integer H, (0 . . . 31) |

In some cases, two or more table rows might share a common frequency allocation or a common MCS, as long as the other parameter (e.g. MCS or frequency allocation) is different.

In some embodiments, a UE may determine the resource block assignment in frequency domain using the corresponding resource allocation field in the detected PDCCH DCI or RRC signaling. There are two frequency resource allocation types, as described below.

In uplink resource allocation of type 0, the resource block assignment information includes a bitmap indicating the Resource Block Groups (RBGs) that are allocated to the scheduled UE. An RBG is a set of consecutive virtual resource blocks defined by higher layer parameter rbg-Size configured in pusch-Config and the size of the bandwidth part as defined in Table 6.1.2.2.1-1.

TABLE 6.1.2.2.1-1

| Nominal RBG size P | | |
|---|---|---|
| Carrier Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

The total number of RBGs ($N_{RPG}$) for a uplink bandwidth part i of size $N_{BWP,i}^{size}$ PRBs is given by $N_{RBG}=\lceil(N_{BWP,i}^{size}+(N_{BWP,i}^{start} \bmod P)/P\rceil$ where:

the size of the first RBG is $RBG_0^{size}=P-N_{BWP,i}^{start} \bmod P$;

the size of the last RBG is $RBG_{last}^{size}=(N_{BWP,i}^{start}+N_{BWP,i}^{size}) \bmod P$ if $(N_{BWP,i}^{start}+N_{BWP,i}^{size}) \bmod P>0$ and P otherwise; and the size of all other RBG is P.

The bitmap is of size $N_{RBG}$ bits with one bitmap bit per RBG such that each RBG is addressable. The RBGs can be indexed in the order of increasing frequency of the bandwidth part and starting at the lowest frequency. The order of RBG bitmap is such that RBG 0 to RBG $N_{BG}-1$ are mapped from MSB to LSB of the bitmap. The RBG is allocated to the UE if the corresponding bit value in the bitmap is 1, the RBG is not allocated to the UE otherwise. Here, $N_{RBG}$ may be assumed to have a value of 18, although it may be another value.

Bit string 1 (size 18), for example can be 111100001010110010, which means that the first RBG, $2^{nd}$, $3^{rd}$, $4^{th}$, $9^{th}$, $11^{th}$, $13^{th}$, $14^{th}$, and $17^{th}$ RBG are allocated to the UE.

| Index | DMRS sequence initialization or cycle shift | MCS |
|---|---|---|
| 0 | 0 | Integer A, (0 . . . 31) |
| 1 | 1 | Integer B, (0 . . . 31) |

Regarding DMRS sequence initialization or cycle shift $n_{SCID} \in \{0,1\}$, the quantity $n_{SCID} \in \{N,1\}$ is indicated by signaling. DMRS sequence r(n) may be generated according to $$r(n) = \frac{1}{\sqrt{2}}(1 - 2 \cdot c(2n)) + j\frac{1}{\sqrt{2}}(1 - 2 \cdot c(2n + 1)).$$

where the pseudo-random sequence c(i) is defined as follows:

generic pseudo-random sequences are defined by a length-31 Gold sequence.

The output sequence c(n) of length $M_{PN}$, where n=0, 1, . . . , $M_{PN}-1$, is defined by $$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_C=1600$ and the first m-sequence $x_1(n)$ is initialized with $x_1(0)=1, x_1(n)=0$, n=1, 2, . . . , 30. The initialization of the second m-sequence, $x_2(n)$, is denoted by $c_{int}=\sum_{i=0}^{30} x_2(i)\cdot 2^i$ with the value depending on the application of the sequence. The pseudo-random sequence generator is initialized with $$c_{int}=(2^{17}(N_{symb}^{slot} n_{s,f}^{\mu}+l+1)(2N_{ID}^{nSCID}+1)+2N_{ID}^{nSCID}+n_{SCID})\bmod 2^{31}$$

where l is the OFDM symbol number within the slot, $n_{s,f}^{\mu}$ is the slot number within a frame, and $N_{ID}^0, N_{ID}^0 \in \{0, 1, . . . , 65535\}$ are given by the higher-layer parameters scramblingID0 and scramblingID1, respectively, in the DMRS-UplinkConfig IE if provided and the PUSCH is scheduled by DCI format 0_1 or by a PUSCH transmission with a configured grant;

$N_{ID}^0 \in \{0, 1, . . . , 65535\}$ is given by the higher-layer parameter scramblingID0 in the DMRS-UplinkConfig IE if provided and the PUSCH is scheduled by DCI format 0_0 with the CRC scrambled by C-RNTI, MCS-C-RNTI, or CS-RNTI;

$N_{ID}^{nSCID}=N_{ID}^{cell}$ otherwise.

The bit width for this timeDomainAllocation can be determined as $\lceil \log_2(I) \rceil$ bits, where I is the number of entries in the higher layer parameter pusch-TimeDomainAllocationList if the higher layer parameter is configured; otherwise I is the number of entries in the default table. timeDomainAllocation as indicated includes SLIV, where the starting symbol S is relative to the start of the slot, and the number of consecutive symbols L counting from the symbol S allocated for the PUSCH are determined from the start and length indicator SLIV of the indexed row:

if (L−1)≤7 then
  SLIV=14−(L−1)+S
else
  SLIV=14·(14−L+1)+(14−1−S)
where 0<L≤14−S.

The tables below shows example valid S and L combinations associated with a PUSCH/PDSCH mapping type, as well as example values for timeDomainAllocation, frequencyDomainAllocation, and MCS.

| PUSCH/PDSCH | Normal cyclic prefix | | | Extended cyclic prefix | | |
|---|---|---|---|---|---|---|
| mapping type | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 11} | {1, . . . , 12} | {1, . . . , 12} |

| Index | timeDomainAllocation | frequencyDomainAllocation | MCS |
|---|---|---|---|
| 1 | SLIV1 | Bit string 1(size 18) | Delat 1 |
| 2 | SLIV2 | Bit string 2(size 18) | Delta 2 |
| 3 | SLIV3 | Bit string 3(size 18) | Delta 3 |
| 4 | SLIV4 | Bit string 4(size 18) | Delta 4 |

| Index | frequencyDomainAllocation | MCS |
|---|---|---|
| 1 | Frequency offset 1 | Delta 1 |
| 2 | Frequency offset 2 | Delta 2 |
| 3 | Frequency offset 3 | Delta 3 |
| 4 | Frequency offset 4 | Delta 4 |

In some embodiments, resource configuration may be performed for DL SPS without DCI activation. In this case, at least one of the following existing parameters in DCI formats 1_0 or 1_1 in R15 can be configured in an RRC signal: frequency domain resource assignment, time domain resource assignment, VRB-to-PRB mapping, PRB bundling size indicator, Rate matching indictor, MCS, redundancy version, ZP CSI-RS trigger to trigger aperiodic ZP CSI-RS, Downlink assignment index, SRS request, CBG transmission information (CBGTI), CBG flushing out information (CBGFI), Antenna ports, DMRS sequence initialization.

In some embodiments, at least one of the following UL related parameters may be configured in an RRC signal for DL SPS without DCI activation: PDSCH-to-HARQ feedback timing indicator, TPC command for scheduled PUCCH, and PUCCH resource indicator.

Furthermore, parameters that are currently configured by RRC, e.g. aggregationFactorDL (i.e. the number of repetitions) can be included in the same RRC IE used to configure the DL SPS without DCI activation.

In some embodiments, at least one of the following parameters may be configured in an RRC signal for DL SPS without DCI activation: periodicity, new-RNTI, timedomainOffset, nrofHARQ-Processes and MCStable.

In some embodiments, a downlink power offset parameter may be configured in an RRC signal for DL SPS without DCI activation. For example, the downlink power offset parameter may use 1 bit, as defined in the table below:

| Downlink power offset field | $\delta_{power\text{-}offset}$ [dB] |
|---|---|
| 0 | −10log10(2) |
| 1 | 0 |

Inclusion of a downlink power offset parameter in the RRC signal allows resource sharing in DL, which can support more UEs using a non-orthogonal multiple access (NoMA), or Multiple User Superposition Transmission (MUST), or a multi-user multiple-input, multiple-output (MIMO) scheme. Pre-defined paired UEs and far UE information for interference cancellation reception at the near UE, e.g. power allocation, MCS, DMRS, which can enable multiple UEs to share the same time domain and frequency resources. Thus, low latency of each UE can be achieved because UEs can transmit their data and do not need to wait until other UEs finish their transmission for a given time slot. High spectrum efficiency of the whole system can be achieved as well.

In some embodiments, some or all of the following parameters may be configured in an RRC signal that includes a SPS resource configuration signal such as the SPS-Config IE: frequency domain resource assignment, time domain resource assignment, VRB-to-PRB mapping, PRB bundling size indicator, rate matching indictor, MCS, redundancy version, ZP CSI-RS trigger to trigger aperiodic ZP CSI-RS, Downlink assignment index, SRS request, CBG transmission information (CBGTI), CBG flushing out information (CBGFI), antenna port(s), DMRS sequence initialization, PDSCH-to-HARQ feedback timing indicator, TPC command for scheduled PUCCH, PUCCH resource indicator, a number of repetitions, periodicity, whether HARQ ACK/NACK feedback or not, new-RNTI, timedomainOffset, nrofHARQ-Processes, MCS table, downlink power offset, and TBS.

In some embodiments, some or all of the following parameters may be configured in an RRC signal that includes a SPS resource configuration signal such as the SPS-Config IE: VRB-to-PRB mapping, PRB bundling size indicator, Rate matching indictor, redundancy version, ZP CSI-RS trigger to trigger aperiodic ZP CSI-RS, downlink assignment index, SRS request, CBG transmission information (CBGTI), CBG flushing out information (CBGFI), DMRS sequence initialization, PDSCH-to-HARQ feedback timing indicator, TPC command for scheduled PUCCH, PUCCH resource indicator, a number of repetitions, periodicity, whether HARQ ACK/NACK feedback or not, new-RNTI, timedomainOffset, nrofHARQ-Processes, MCStable, downlink power offset, and TBS.

In alternative embodiments, parameters not included in the RRC signal can be included in a physical layer control signaling, for example a group DCI signal as described before. The group DCI signal can be an activation DCI signal.

In some embodiments, some or all of the following parameters may be configured in an RRC signal that includes a SPS resource configuration signal such as the SPS-Config IE: VRB-to-PRB mapping, PRB bundling size indicator, rate matching indictor, redundancy version, ZP CSI-RS trigger to trigger aperiodic ZP CSI-RS, downlink assignment index, SRS request, CBG transmission information (CBGTI), CBG flushing out information (CBGFI), antenna port(s), DMRS sequence initialization, periodicity, new-RNTI, timedomainOffset, nrofHARQ-Processes, MCStable, and TBS.

In alternative embodiments, parameters not included in the RRC signal can be included in a physical layer control signaling, for example a group DCI signal as described before or in a SPS PDSCH.

Figure 4:
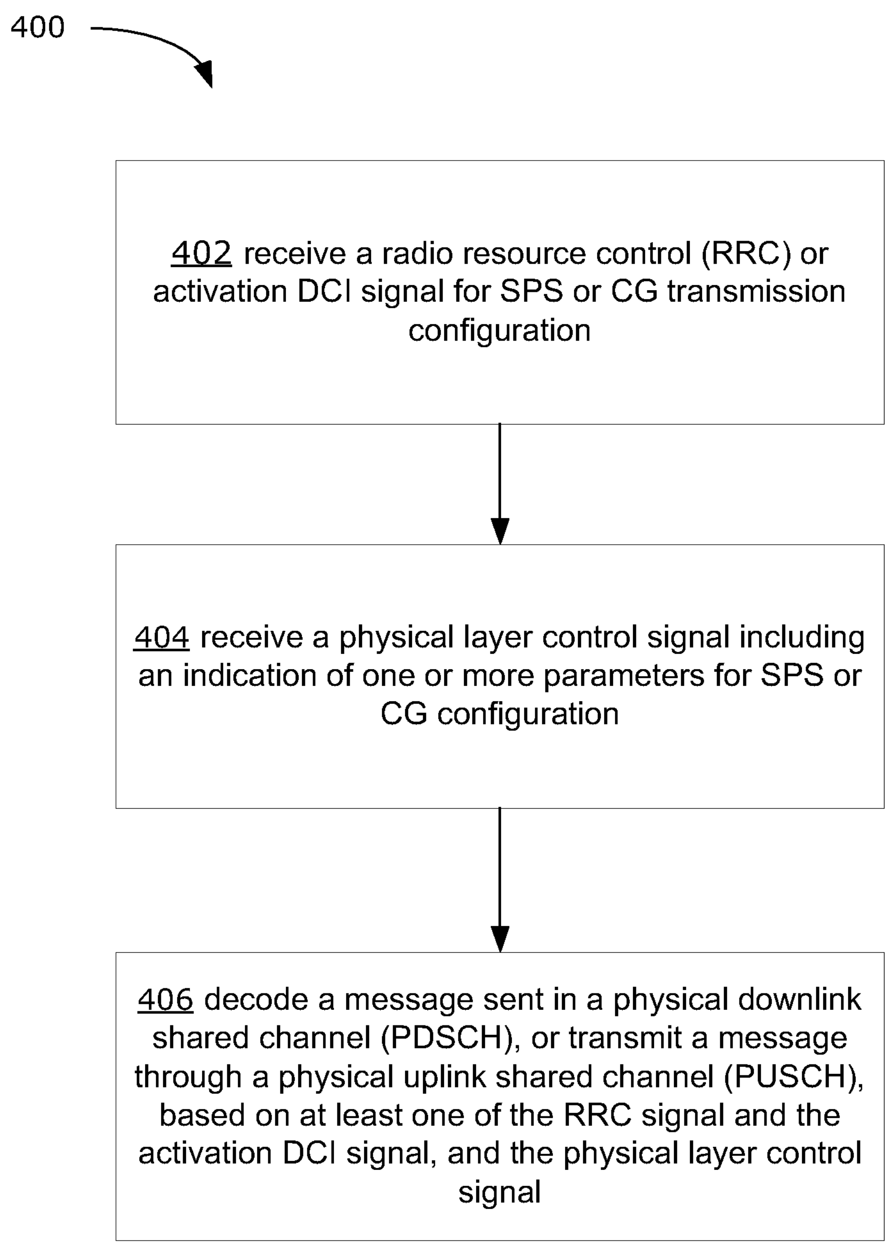
FIG. 4 is a flowchart illustrating an example method performed by a user equipment for a SPS or CG configuration in accordance with an example embodiment.

FIG. 4 is a flowchart illustrating an example method 400 performed by an ED 110 such as a UE for a SPS or CG resource configuration in accordance with an example embodiment.

At 402, the UE receives a radio resource control (RRC) or activation DCI signal for SPS or CG transmission configuration.

At 404, the UE receives, through a physical layer channel, a physical layer control signal including a value for one or more parameters for transmission configuration. The one or more parameters may include, for example, MCS or a frequency resource allocation.

At 406, the UE decodes a message sent in a physical downlink shared channel (PDSCH) or transmits a message through a physical uplink shared channel (PUSCH) based on at least one of the RRC signal and the activation DCI signal, and the one or more parameters in the physical layer control signal.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method performed by a communication device, the method comprising:

transmitting, to a user equipment (UE), a radio resource control (RRC) signal or activation downlink control information (DCI) signal for semi-persistent scheduling (SPS) or configured grant (CG) transmission configuration, wherein the RRC signal comprises a configuration of a group-common Radio Network Temporary Identifier (RNTI); and transmitting, to the UE, a physical layer control signal comprising an indication of one or more parameters for SPS or CG transmission, the physical layer control signal comprising a Cyclic Redundancy Check (CRC) portion that is scrambled with the group-common RNTI for the physical layer control signal, the one or more parameters comprising at least one of a modulation and coding scheme (MCS) and a frequency resource allocation, wherein the indication of the one or more parameters in the physical layer control signal comprises one set from multiple sets of the one or more parameters, wherein the physical layer control signal is a group-common physical signalling;

wherein the one set is for a selected available MCS, the selected available MCS being indicated by a number of bits in the RRC or the activation DCI signal, the number of bits being less than another number of bits for indicating the multiple sets, the multiple sets being all available MCS.

2. The method of claim 1, wherein the MCS value is sent in a modulation and coding scheme field in the RRC signal or the activation DCI signal that determines a modulation order and a target code rate based on a predefined table from a plurality of predefined tables, wherein the predefined table from the plurality of predefined tables is determined based on the MCS value in the RRC and activation DCI signal.

3. The method of claim 1, wherein at least one of the RRC signal and the activation DCI signal, and the physical layer control signal are used by the UE to decode a message sent in a physical downlink shared channel (PDSCH) or to transmit a message through a physical uplink shared channel (PUSCH).

4. The method of claim 1, wherein the RRC signal comprises a downlink (DL) semi-persistent scheduling (SPS) configuration information element (IE) or an uplink (UL) configured grant (CG) IE.

5. The method of claim 1, wherein the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

6. The method of claim 1, wherein the one or more parameters comprise at least one of the following parameters: time domain resource allocation, number of antenna ports, DeModulation Reference Signal (DMRS) sequence initialization, CSI request, downlink power offset, and transport block size (TBS), transmit power control (TPC) command for scheduled PUSCH, precoding information, a number of layers, number of antenna ports, a time offset for transmission opportunity.

7. A communication device, comprising:

a transceiver; and a processing unit coupled to the transceiver, the processing unit being configured to execute instructions to cause the transceiver to:

transmit to a user equipment (UE), a radio resource control (RRC) signal or activation downlink control information (DCI) signal for semi-persistent scheduling (SPS) or configured grant (CG) transmission configuration, wherein the RRC signal comprises a configuration of a group-common Radio Network Temporary Identifier (RNTI); and transmit to the UE, a physical layer control signal comprising an indication of one or more parameters for SPS or CG transmission, the physical layer control signal comprising a Cyclic Redundancy Check (CRC) portion that is scrambled with the group-common RNTI for the physical layer control signal, the one or more parameters comprising at least one of a modulation and coding scheme (MCS) and a frequency resource allocation, wherein the indication of the one or more parameters in the physical layer control signal comprises one set from multiple sets of the one or more parameters, wherein the physical layer control signal is a group-common physical signalling;

wherein the one set is for a selected available MCS, the selected available MCS being indicated by a number of bits in the RRC or the activation DCI signal, the number of bits being less than another number of bits for indicating the multiple sets, the multiple sets being all available MCS.

8. The communication device of claim 7, wherein the MCS value is sent in a modulation and coding scheme field in the RRC signal or the activation DCI signal that determines a modulation order and a target code rate based on a predefined table from a plurality of predefined tables, wherein the predefined table from the plurality of predefined tables is determined based on the MCS value in the RRC and activation DCI signal.

9. The communication device of claim 7, wherein at least one of the RRC signal and the activation DCI signal, and the physical layer control signal are used by the UE to decode a message sent in a physical downlink shared channel (PDSCH) or to transmit a message through a physical uplink shared channel (PUSCH).

10. The communication device of claim 7, wherein the RRC signal comprises a downlink (DL) semi-persistent scheduling (SPS) configuration information element (IE) or an uplink (UL) configured grant (CG) IE.

11. The communication device of claim 7, wherein the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

12. The communication device of claim 7, wherein the one or more parameters comprise at least one of the following parameters: time domain resource allocation, number of antenna ports, DeModulation Reference Signal (DMRS)

sequence initialization, CSI request, downlink power offset, and transport block size (TBS), transmit power control (TPC) command for scheduled PUSCH, precoding information, a number of layers, number of antenna ports, a time offset for transmission opportunity.

13. A method performed by a communication device, the method comprising:

receiving by a user equipment (UE), a radio resource control (RRC) signal or activation downlink control information (DCI) signal for semi-persistent scheduling (SPS) or configured grant (CG) transmission configuration, wherein the RRC signal comprises a configuration of a group-common Radio Network Temporary Identifier (RNTI); and receiving by the UE, a physical layer control signal comprising an indication of one or more parameters for SPS or CG transmission, the physical layer control signal comprising a Cyclic Redundancy Check (CRC) portion that is scrambled with the group-common RNTI for the physical layer control signal, the one or more parameters comprising at least one of a modulation and coding scheme (MCS) and a frequency resource allocation, wherein the indication of the one or more parameters in the physical layer control signal comprises one set from multiple sets of the one or more parameters, wherein the physical layer control signal is a group-common physical signalling;

wherein the one set is for a selected available MCS, the selected available MCS being indicated by a number of bits in the RRC or the activation DCI signal, the number of bits being less than another number of bits for indicating the multiple sets, the multiple sets being all available MCS.

14. The method of claim 13, wherein the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

15. A communication device, comprising:

a transceiver; and a processing unit coupled to the transceiver, the processing unit being configured to execute instructions to cause the transceiver to:

receive by a user equipment (UE), a radio resource control (RRC) signal or activation downlink control information (DCI) signal for semi-persistent scheduling (SPS) or configured grant (CG) transmission configuration, wherein the RRC signal comprises a configuration of a group-common Radio Network Temporary Identifier (RNTI); and receive by the UE, a physical layer control signal comprising an indication of one or more parameters for SPS or CG transmission, the physical layer control signal comprising a Cyclic Redundancy Check (CRC) portion that is scrambled with the group-common RNTI for the physical layer control signal, the one or more parameters comprising at least one of a modulation and coding scheme (MCS) and a frequency resource allocation, wherein the indication of the one or more parameters in the physical layer control signal comprises one set from multiple sets of the one or more parameters, wherein the physical layer control signal is a group-common physical signalling;

wherein the one set is for a selected available MCS, the selected available MCS being indicated by a number of bits in the RRC or the activation DCI signal, the number of bits being less than another number of bits for indicating the multiple sets, the multiple sets being all available MCS.

16. The communication device of claim 15, wherein the physical layer control signal comprises a plurality of blocks, wherein each of the plurality of blocks corresponds to a respective UE from a plurality of UEs, and comprises a respective indication for at least one parameter for the respective UE, or at least one indication that indicates a plurality of parameters for the respective UE.

* * * * *